United States Patent
May et al.

(10) Patent No.: US 11,293,108 B2
(45) Date of Patent: Apr. 5, 2022

(54) PHOTOELECTROCHEMICAL CELL FOR LIGHT-INDUCED SPLITTING OF WATER

(71) Applicant: TECHNISCHE UNIVERSITÄT ILMENAU, Ilmenau (DE)

(72) Inventors: Matthias May, Cambridgeshire (GB); Thomas Hannappel, Berlin (DE); Hans-Joachim Lewerenz, Werder/Havel (DE)

(73) Assignee: TECHNISCHE UNIVERSITÄT ILMENAU, Ilmenau (DE)

( * ) Notice: Subject to any disclaimer, the term of this patent is extended or adjusted under 35 U.S.C. 154(b) by 461 days.

(21) Appl. No.: 16/341,457

(22) PCT Filed: Sep. 7, 2017

(86) PCT No.: PCT/EP2017/072444
§ 371 (c)(1),
(2) Date: Apr. 12, 2019

(87) PCT Pub. No.: WO2018/068953
PCT Pub. Date: Apr. 19, 2018

(65) Prior Publication Data
US 2019/0368058 A1  Dec. 5, 2019

(30) Foreign Application Priority Data
Oct. 14, 2016  (DE) .................... 10 2016 119 634.7

(51) Int. Cl.
*C25B 9/70* (2021.01)
*C25B 9/17* (2021.01)
(Continued)

(52) U.S. Cl.
CPC .................. *C25B 9/17* (2021.01); *C25B 1/04* (2013.01); *C25B 1/55* (2021.01); *C25B 11/02* (2013.01)

(58) Field of Classification Search
CPC .... C25B 9/70; C25B 9/77; C25B 1/04; C25B 9/17; C25B 9/00; C25B 1/55; C25B 3/25; C25B 9/23; C25B 9/40
See application file for complete search history.

(56) References Cited

U.S. PATENT DOCUMENTS

| | | | |
|---|---|---|---|
| 2011/0174610 A1 | 7/2011 | Nomura et al. | |
| 2016/0108527 A1 | 4/2016 | Kudo et al. | |
| 2017/0342577 A1* | 11/2017 | Wu | ........................ C25B 9/73 |

FOREIGN PATENT DOCUMENTS

| | | |
|---|---|---|
| KR | 101349340 B1 | 1/2014 |
| WO | 2015/002093 A1 | 1/2015 |

OTHER PUBLICATIONS

International Search Report of PCT Patent Application No. PCT/EP2017/072444 dated Oct. 27, 2017.

* cited by examiner

*Primary Examiner* — Zulmariam Mendez

(57) ABSTRACT

A cell includes a transparent covering element arranged at a top side of the cell, an interior arranged below the covering element, the interior being partly filled with an electrolyte, and a semiconductor absorber arranged in or at the electrolyte. Furthermore, the cell includes one or more counterelectrodes arranged above the semiconductor absorber in the electrolyte and electrically connected to a back electrode arranged at a rear side of the semiconductor absorber facing away from the covering element, and one or more membrane enclosures, wherein a counterelectrode in each case extends within a membrane enclosure. One or more channel spaces are formed between an electrolyte surface and an underside of the covering element, the one or more channel spaces extending along one or more partial regions of the underside of the covering element and being usable for guiding away a first gas formed in the interior of the cell.

10 Claims, 4 Drawing Sheets

(51) Int. Cl.
*C25B 1/04* (2021.01)
*C25B 11/02* (2021.01)
*C25B 1/55* (2021.01)

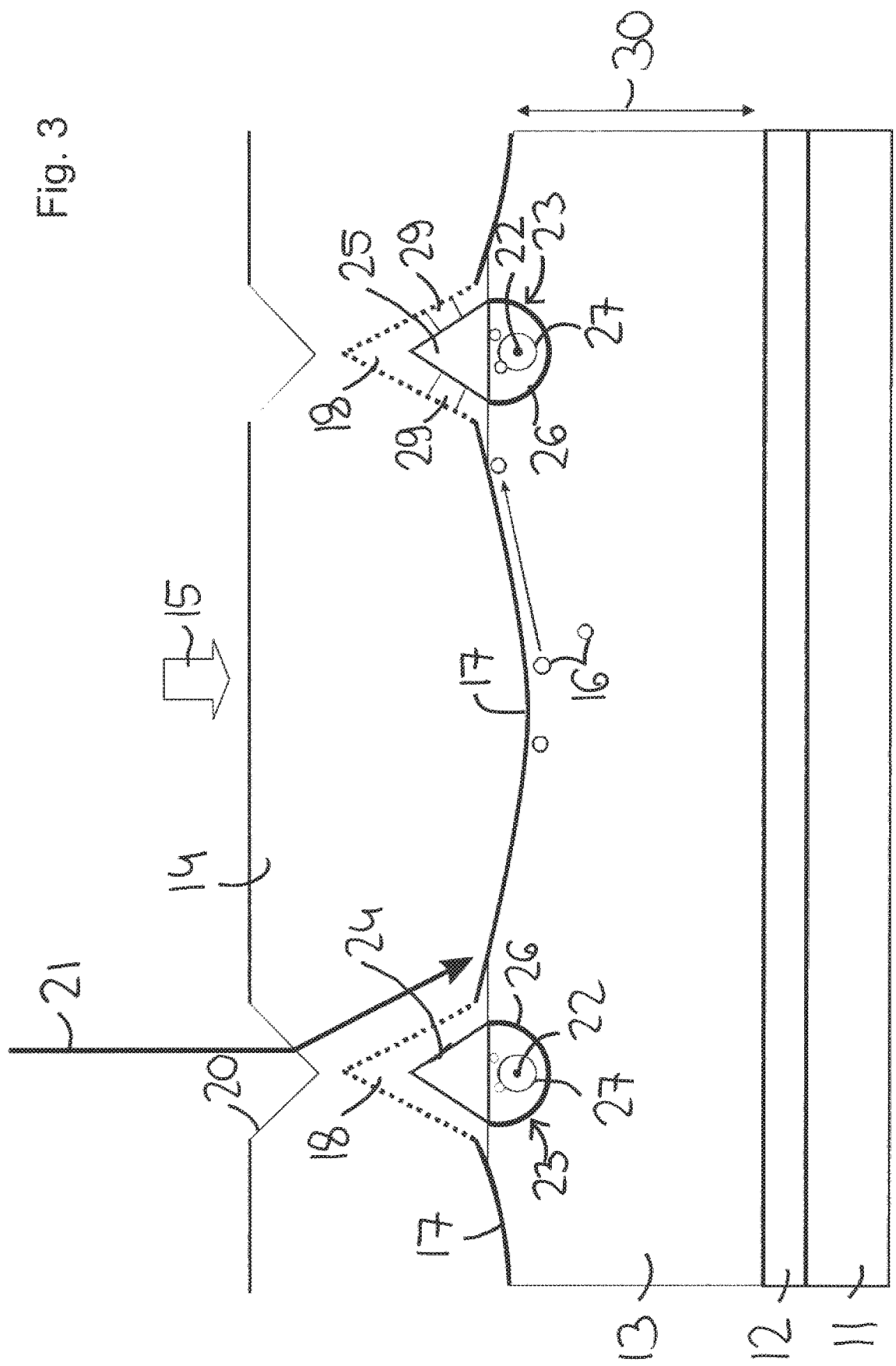

PHOTOELECTROCHEMICAL CELL FOR LIGHT-INDUCED SPLITTING OF WATER

FIELD OF THE INVENTION

The invention relates to a photoelectrochemical cell with a transparent cover element, which is arranged on an upper side of the cell, an interior arranged below the cover element, which is filled in part with an electrolyte, and a semiconductor absorber arranged in or on the electrolyte.

BACKGROUND OF THE INVENTION

US patent application US 2016/0108527 A1 describes a photoelectrochemical reaction device. The reaction device comprises a solution tank having a first solution, a multilayer structure arranged in the solution tank and having a first electrode, a second electrode formed below the first electrode, a photovoltaic layer formed between the first and second electrodes, which layer is configured to perform charge separation by incident light from above, and a first insulating layer, which is mounted on an exposed surface of the second electrode. The photoelectrochemical reaction device further comprises a tube arranged in the solution tank above the first electrode, which tube contains a second solution and has pores which extend from the outer surface to the inner surface, and lines which electrically connect the second electrode and the tube.

International patent application WO 2015/002093 A1 describes a photoelectrochemical reactor. The photoelectrochemical reactor comprises a solution tank for a first solution, a multilayer structure arranged in the solution tank and having a first electrode, a second electrode formed below the first electrode and a photovoltaic layer formed between the first and second electrodes, which layer is configured to perform charge separation using optical energy, and a first insulating layer, which is formed on the exposed surface of the second electrode. The photoelectrochemical reactor further comprises tubes arranged in the solution tank, which tubes are arranged facing the first electrode, contain a second solution and have holes which extend from the outer surface to the inner surface of the tubes, and electrical lines, which connect the second electrode to the tubes.

Korean patent specification KR 101349340 B1 describes a device for water splitting. The device for water splitting comprises one or more tubes for producing and conducting away hydrogen.

Problem Addressed by the Invention

The object of the invention is therefore to provide a cell for water splitting which enables improved conducting away of the gases produced and exhibits higher efficiency than previous cells.

Solution According to the Invention

The solution to the problem addressed is achieved by providing a cell which comprises a transparent cover element, which is arranged on an upper side of the cell, an interior arranged below the cover element, which is filled in part with an electrolyte, and a semiconductor absorber arranged in or on the electrolyte. The cell further comprises one or more counter-electrodes, which are arranged above the semiconductor absorber in the electrolyte and are electrically connected with a rear electrode arranged on a rear side of the semiconductor absorber remote from the cover element, as well as one or more membrane shells, wherein a counter-electrode extends within each membrane shell. Between an electrolyte surface and an underside of the cover element, one or more channel spaces are formed, which extend along one or more sub-regions of the underside of the cover element and are useful for conducting away a first gas formed in the interior of the cell.

With the cell according to the invention, efficient conducting away of the first gas formed in the interior of the cell, for example at the semiconductor absorber, is enabled by the at least one channel space, which extends between the electrolyte surface and the underside of the cover element. The gas bubbles arising in the lower region of the cell ascend upwards in the electrolyte as a result of buoyancy to the cover element and are directed from there to the channel spaces, in which the gas collects and may be conducted away. In this case, the one or more channel spaces are part of the interior of the cell. In the context of the present invention, expressions such as "top", "bottom", "above", "below", "upper side" etc. relate to the direction, predetermined by the buoyancy of the gas bubbles and thus ultimately by gravity, in which the gas bubbles ascend from the semiconductor absorber placed at the bottom to the absorber layer placed at the top. In this respect, the cover element is arranged at the top and the electrolyte with the semiconductor absorber located therein is arranged below the cover element.

The channel spaces allow the first gas to be efficiently conducted away. In this way, gas bubbles present within the electrolyte may be conducted quickly away and thus removed from the electrolyte, such that light scattering within the electrolyte is reduced. Consequently, more light reaches the semiconductor absorber and the cell as a whole operates more efficiently, so improving the level of efficiency. A further advantage is that, by integrating the channel spaces into the underside of the cover element, a compact and space-saving configuration of the cell is made possible. This makes it possible to construct the cell lower overall and, as a consequence of the reduced structural height, the distance in the electrolyte to be penetrated by the light is also reduced, so improving light yield and therefore efficiency. The recesses necessary for forming the channel spaces may be simply produced from a manufacturing standpoint. In the case of the cell according to the invention, the counter-electrodes and the membrane shells enclosing them are likewise mounted above the semiconductor absorber, wherein the membrane shells, which are configured at least in places in the form of a membrane, allow the second gas to be efficiently conducted away. The cell according to the invention enables both gases arising to be efficiently conducted away. The improvements in efficiency as a result of the shorter light and ion transport distances may in particular be used to enable use of an electrolyte which is subject to less stringent restrictions than hitherto, for example in respect of its pH. This makes it possible to use a less aggressive electrolyte, whereby the durability of the cell is improved and the selection of materials with regard to the semiconductor and the catalysts is increased.

A cell according to the invention comprises a transparent cover element, which is arranged on an upper side of the cell, an interior arranged below the cover element and filled in part with an electrolyte, and a semiconductor absorber, which is arranged in or on the electrolyte. The cell further comprises one or more counter-electrodes, which are arranged above the semiconductor absorber in the electrolyte and are electrically connected with a rear electrode arranged on a rear side of the semiconductor absorber remote from the cover element, and one or more membrane shells, wherein a counter-electrode extends within each membrane shell. The at least one membrane shell is arranged within the cell in such a way that only part of the membrane shell is arranged within the electrolyte, wherein an electrolyte surface extends through the at least one membrane shell.

As a result of the membrane shell arranged in part above the electrolyte surface, a free space is provided in the membrane shell, above the electrolyte, and may be used for conducting away gas. It is moreover possible to construct the cell more compactly, because the counter-electrode with the membrane shell is arranged further towards the top. If the membrane shell is arranged for example below a channel space, the upper region of the membrane shell may extend into the channel space. As a consequence of this more compact structure, the height of the region filled with electrolyte and thus also the structural height of the cell may be reduced, so reducing the light paths and improving light yield and thus the efficiency of the cell. Furthermore, less membrane material is needed for constructing the membrane shells.

Preferred Embodiments of the Invention

Advantageous configurations and further developments, which may be used individually or in combination, constitute the subject matter of the dependent claims.

The counter-electrodes and the membrane shells surrounding the counter-electrodes are preferably arranged in the region between the semiconductor absorber and the transparent cover element. The counter-electrodes and the membrane shells are thus displaced in the region above the semiconductor absorber, but are connected via an electrical line with the rear electrode arranged on the rear side of the semiconductor absorber. This results in a compact, space-saving cell structure, since all the electrodes and structural elements are arranged in the region above the semiconductor absorber.

The counter-electrodes preferably take the form of longitudinal electrodes extending in the longitudinal direction. While the first gas is formed at the upper side of the semiconductor absorber, production of the second gas, i.e. for example of hydrogen or oxygen, takes place at the counter-electrodes. To achieve a sufficient level of efficiency, it is advantageous for a sufficiently large reaction surface to be provided by the counter-electrodes. It is therefore advantageous to configure the counter-electrodes as longitudinal electrodes extending longitudinally through the cell. The reaction surface required for gas production is provided in this way.

The membrane shells preferably take the form of membrane tubes surrounding the counter-electrodes. The counter-electrodes extend in the interior of the membrane tubes and are enclosed by the membrane tubes. The membrane tubes extend along the course of the counter-electrodes, wherein gas formed at the counter-electrodes collects within the membrane tubes. The membrane tubes keep the gases arising at the various electrodes apart from one another, so preventing explosive gas mixtures from arising, while at the same time ion transport is ensured.

The membrane shells preferably extend through the cell at least in part within the electrolyte. While the counter-electrodes are wholly arranged in the electrolyte, the membrane shells enclosing the counter-electrodes may be arranged either wholly or only in part within the electrolyte.

The at least one channel space preferably takes the form of at least one recess extending at the bottom of the cover element. If the required gas conducting channels for the first gas take the form of recesses on the bottom of the cover element, this has the advantage that the transport distances for conducting away the gas bubbles are small. Furthermore, the recesses in the cover element may be simply produced.

The at least one channel space is preferably not filled with electrolyte. The channel space is preferably open towards the electrolyte surface, such that gas bubbles may penetrate from the electrolyte into the free channel space, wherein gas is conducted away via the channel space.

The first gas is preferably formed at the semiconductor absorber. The first gas is formed at the semiconductor absorber in the form of gas bubbles, which ascend upwards from the semiconductor absorber to the cover element. The first gas may be conducted away there via the one or more channel spaces.

The cell is preferably designed for light-induced water splitting. The cell may for example be used for direct solar water splitting, wherein water is split into hydrogen and oxygen by the sunlight incident on the cell.

The semiconductor absorber preferably has a catalytically active layer on the side facing the cover element. In this way, the incident light arrives via the transparent absorber element and the electrolyte at the catalytically active layer on the upper side of the semiconductor absorber. The catalytically active layer may be a cathode or an anode.

The counter-electrodes and the membrane shell surrounding the counter-electrodes are preferably each arranged below the channel spaces. The counter-electrodes and the membrane shells surrounding the counter-electrodes are more preferably each arranged directly below the channel spaces. The channel spaces serve in conducting away the first gas, which is formed at the upper side of the semiconductor absorber and arrives at the channel spaces via the electrolyte. In contrast, the second gas is produced at the counter-electrodes arranged therebelow within the membrane shells surrounding the counter-electrodes. The membrane shells preferably take the form of membrane tubes, which enclose the counter-electrodes and via which the second gas may be conducted away. The result is therefore an arrangement in which the first gas is conducted away via the channel spaces and the second gas is conducted away via the membrane shells or membrane tubes located therebelow. As a result of this spatially coincident superimposed arrangement of the two means for conducting away gas, it is ensured in particular that the light incident on the cover element is not blocked unnecessarily, such that the amount of light impinging on the semiconductor absorber is not impaired unnecessarily. By arranging the structural elements needed for conducting away gas one below the other and as a result of the two means for conducting away gas in this way being spatially compactly embodied, it is ensured that the remaining area of the cell is available for processing the incident light. In this way, a highly efficient cell may be produced. Furthermore, the superposed arrangement of the channel spaces and of the membrane shells or membrane tubes results in a space-saving and compact cell design, which in turn contributes to optimizing transport distances within the cell.

Preferably, one or more connecting webs are mounted on the cover element, with which connecting webs the counter-electrode and the membrane shell surrounding the counter-electrode are held in a position below an associated channel space. The membrane shells and the counter-electrodes are mounted directly on the cover element, such that all the structural features for conducting away gas are integrated into the cover element. The cover element thus constitutes a lid element, in which a major part of the structures needed for operation of the cell are integrated. The lid element has then merely to be placed onto the electrolyte-filled lower part of the cell with the semiconductor absorber, in order to obtain a functional cell.

The channel spaces are preferably arranged over the counter-electrodes and the membrane shells surrounding the counter-electrodes, such that incident light passing through the cover element onto the semiconductor absorber is blocked as little as possible. Were the membrane shells to be arranged next to the channel spaces, blocking of incident light would be markedly greater.

The channel spaces arranged on the underside of the cover structure preferably follow the course of the counter-electrodes and the membrane shells. In this way, an overlapping course of the channel spaces and the membrane shells arranged therebelow is obtained. Both the membrane shells and the channel spaces located thereabove preferably extend longitudinally through the cell.

Viewed from the upper side of the cover element, the channel spaces, the counter-electrodes and the membrane shells enclosing them preferably at least largely overlap.

The channel spaces preferably extend above and substantially parallel to the counter-electrodes and the membrane shells enclosing them. More preferably, the channel spaces, the counter-electrodes and the membrane shells extend parallel to one another in the longitudinal direction.

A second gas arising at the counter-electrodes may preferably be conducted away via the membrane shells. To this end, the membrane shell preferably takes the form of a membrane tube enclosing the counter-electrode, which membrane tube allows the second gas arising at the counter-electrode to be transported away.

The first gas is preferably hydrogen and the second gas oxygen. Alternatively, the first gas may be oxygen and the second gas hydrogen.

A plurality of regularly spaced channel spaces are preferably formed between the electrolyte surface and the underside of the cover element. This makes it possible to keep the transport distances for the gas bubbles small, such that the gas bubbles pass quickly from the electrolyte into the channel spaces. This reduces light scattering within the electrolyte, so in turn increasing efficiency.

The underside of the cover element preferably has at least one region in which the underside of the cover element is in contact with the electrolyte. The underside of the cover element preferably has at least one region between neighboring channel spaces in which the underside of the cover element is in contact with the electrolyte. In the region of the channel spaces the cover element is not in contact with the electrolyte, since here there is an interspace between the electrolyte surface and the cover element. In the at least one region between the channel spaces, it is however advantageous for the electrolyte to be in direct contact with the underside of the cover element, because this results in good light transmission.

The underside of the cover element preferably has at least one region in which the underside of the cover element is in contact with the electrolyte, wherein at least one portion of this at least one region forms a stop face for gas bubbles. More preferably, the underside of the cover element has at least one region in which the underside of the cover element is in contact with the electrolyte, wherein at least one portion of this at least one region forms a stop face for gas bubbles which is designed to convey the gas bubbles along a curved or inclined surface to a neighboring channel space. It is proposed to form the one or more regions on the underside of the cover element, which are located between the channel spaces and which are in contact with the electrolyte, in each case as a stop face for gas bubbles. These gas bubbles ascend upwards as a consequence of buoyancy to the cover element and impinge on this stop face, which is preferably curved or obliquely inclined, such that the impinging gas bubbles are directed along this stop face sideways to the closest channel space. The stop faces thus enable the ascending gas bubbles to pass quickly into the channel spaces. This makes it possible to remove the gas bubbles from the electrolyte rapidly, such that light scattering within the electrolyte is reduced, which in turn improves the efficiency of the cell.

Preferably, at least sub-regions of the channel spaces are provided with a hydrophobic coating or modified by means of a hydrophobizing surface treatment. This prevents the walls of the channel spaces from being wetted with electrolyte, such that the channel spaces are kept free for conducting away the gas.

Preferably, at least sub-regions of the regions of the underside of the cover element in contact with the electrolyte are provided with a hydrophilic coating or modified by means of a hydrophilizing surface treatment. Hydrophilization ensures good wetting of the underside of the cover element with electrolyte. In this way, the adhesion of gas bubbles to the wall may be reduced.

The stop faces for gas bubbles on the underside of the cover element are preferably provided with a hydrophilic coating or modified by means of a hydrophilizing surface treatment. In this way, good wetting with electrolyte is achieved precisely at the stop faces, such that the adhesion of gas bubbles is reduced. The gas bubbles therefore do not adhere and are diverted quickly sideways to the channel spaces.

The transparent cover element preferably consists of one of the following: glass, silica glass, transparent plastics material. The at least one membrane shell preferably consists at least in places of a proton-conducting membrane.

At least one optical element is preferably arranged in or on the cover element, which optical element is designed to direct incident light past the at least one channel space to the semiconductor absorber. Using the at least one optical element it is possible to deflect light incident in the region of the channel space, which would not reach the semiconductor absorber without corresponding optical elements, towards the semiconductor absorber, where this light can be used for water splitting. Blocking of light by the structures for conducting away gas is thus counteracted. By deflecting light which cannot be used per se towards the semiconductor absorber, the light yield and thus the efficiency of the cell are increased.

At least one optical element is preferably arranged on or in the cover element, which optical element is designed to direct incident light past a channel space respectively arranged therebelow to the semiconductor absorber. The respective optical element is thus preferably arranged directly above the respective channel space, such that the light impinging per se on the channel space may be guided by the optical element arranged thereabove past the channel space. At least one optical element is preferably arranged on or in the cover element, which optical element is designed to direct incident light past a channel space arranged respectively therebelow, a counter-electrode arranged respectively below the channel space and a membrane shell respectively surrounding the counter-electrode to the semiconductor absorber.

The at least one optical element is preferably arranged above the at least one channel space and covers the channel spaces when viewed from the top of the cell. More preferably, the at least one optical element is arranged to follow the course of the channel spaces when viewed from the upper side of the cell. Viewed from the cell, the optical elements are thus arranged above the structures for conducting away the gas and follow the course of these structures so as to be able to direct light impinging there to the semiconductor absorber.

The at least one optical element is preferably at least one of the following: a prism element, a lens element, a Fresnel lens element. A prism element may for example have suitable interfaces between gas, glass and electrolyte to achieve a desired deflection of the incident light energy.

The at least one membrane shell is preferably arranged within the cell in such a way that only part of the membrane shell is arranged within the electrolyte, wherein the electrolyte surface extends through the at least one membrane shell. Since the membrane shell extends in part below and in part above the electrolyte surface, a free space arises within the membrane shell which may be used to conduct away gas. A further advantage is that the membrane shell may be placed closer to the cover element, such that the cell may as a whole be of thinner and thus more compact construction. As a result of this structural configuration, the light path between the upper side of the cover element and the semiconductor absorber is shortened, such that as a consequence of this shorter light path improved efficiency of the cell is obtained. It is also advantageous that merely the region of the shell or the tube extending in the electrolyte has to take the form of a membrane, leading to corresponding material savings.

At least the region of the membrane shell extending in the electrolyte takes the form of a membrane. More preferably, the region of the membrane shell arranged above the electrolyte surface can be used to conduct away a second gas formed at the counter-electrode extending within the membrane shell. In the case of this solution, it is for example possible for the upper part of the membrane shell to extend in part into the channel space located thereabove, such that a particularly compact structure is obtained for conducting away the two gases produced.

The region of the membrane shell arranged above the electrolyte surface is preferably formed by a shaped part extending in the longitudinal direction, which shaped part encloses a channel region extending above the electrolyte surface which is formed to transport a second gas arising at the counter-electrode.

The semiconductor absorber is preferably a tandem configuration of two semiconductors of different band gaps, wherein the semiconductor with the larger band gap is arranged above the semiconductor with the smaller band gap. It may alternatively also be a single semiconductor with larger band gap or three semiconductors.

BRIEF DESCRIPTION OF THE DRAWINGS

Further advantageous configurations are described in greater detail below with reference to multiple exemplary embodiments illustrated in the drawings, to which the invention is however not limited. In the drawings:

FIG. 3: shows a cell for water splitting with improved conducting away of the two gases produced in the cell;

DETAILED DESCRIPTION OF EMBODIMENTS OF THE INVENTION

In the description given below of preferred embodiments of the present invention, the same reference signs denote the same or comparable components.

Figure 1:
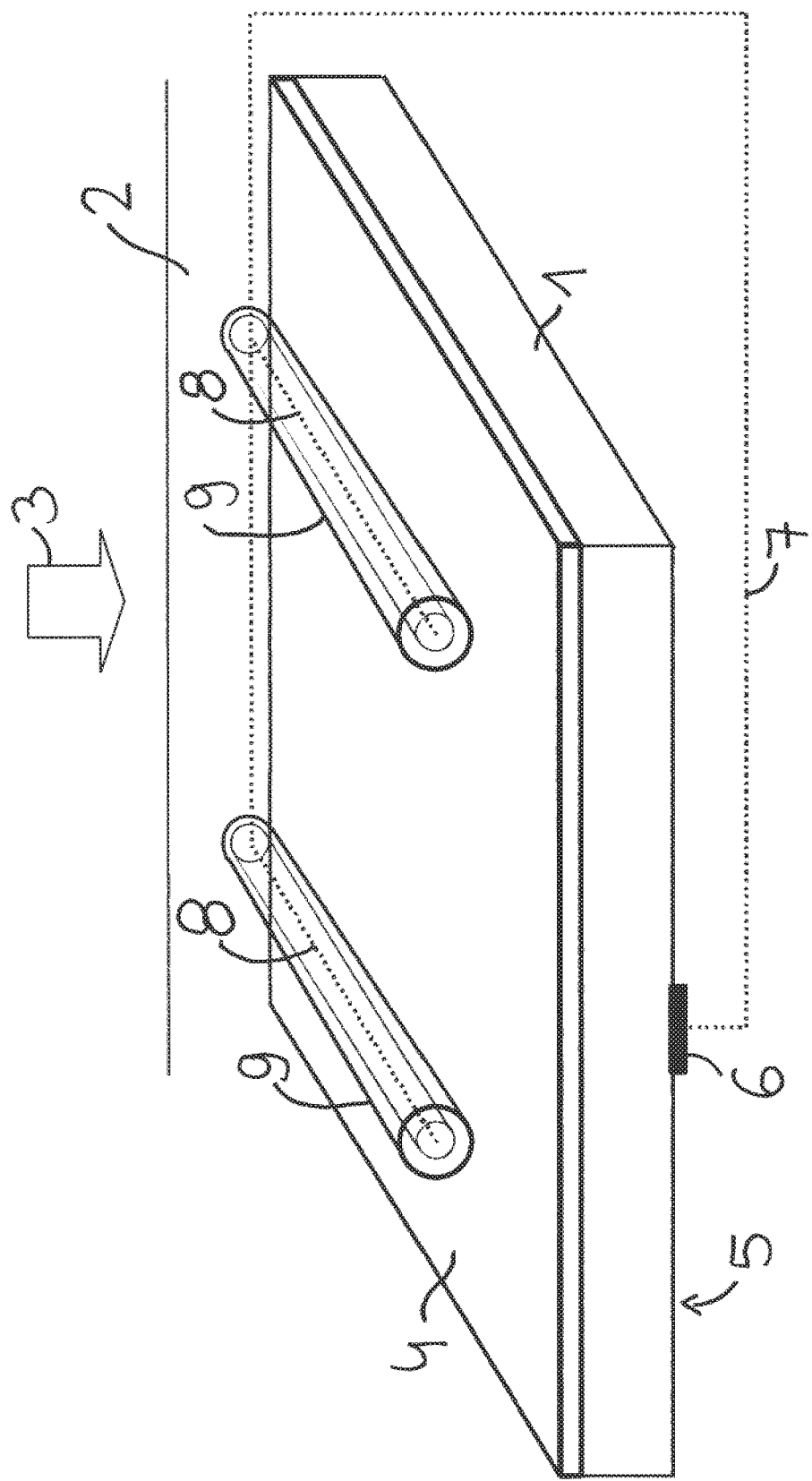
FIG. 1: shows a schematic view of a cell for water splitting.

FIG. 1 is a schematic view of a cell for solar water splitting. The cell comprises a semiconductor absorber 1, which is arranged in an electrolyte 2. A catalytically active layer 4, facing the incident light, is arranged on the upper side of the semiconductor absorber 1. On the rear side of the semiconductor absorber 1, on which light does not shine, a rear electrode 5 is arranged. If light impinges in the direction of arrow 3 on the semiconductor absorber 1, charge separation is brought about within the semiconductor absorber 1, wherein charge carriers of a first polarity migrate to the catalytically active layer 4 and charge carriers of the opposing polarity migrate to the rear electrode 5. The catalytically active layer 4 may for example be a cathode, at which the electrons produced by light incidence collect. During solar water splitting, reduction of $2H^+$ to elemental hydrogen $H_2$, i.e. the reaction $2H^+ + 2e^- \rightarrow H_2$, takes place at the cathode. This production of elemental hydrogen taking place at the cathode is also known as the "Hydrogen Evolution Reaction" or HER. To improve efficiency when converting $H^+$ to elemental hydrogen, the cathode is preferably provided with a suitable catalyst, for example with platinum (Pt) or rhodium (Rh). In this case, the catalyst may be applied in the form of the catalytically active layer 4 or as a component of the catalytically active layer 4 to the upper side of the semiconductor absorber 1, which catalyst may however also be applied as nano-patterning or in the form of nanoparticles to the cathode. The respective catalyst reduces the activation energy when converting $H^+$ to $H_2$.

If the catalytically active layer 4 on the side of the semiconductor absorber 1 facing the incident light takes the form of a cathode, the rear electrode 5 arranged on the rear side of the semiconductor absorber 1 facing away from the light takes the form of the anode. The rear electrode 5 is contacted by means of an ohmic contact 6 and connected electrically via an electrical line 7 to a plurality of counter-electrodes 8, which are arranged extending longitudinally above the catalytically active layer 4 on the side of the semiconductor absorber 1 facing the light. Like the semiconductor absorber 1, the counter-electrodes 8 are also surrounded by the electrolyte 2. If the catalytically active layer 4 takes the form of the cathode, the counter-electrodes 8 take the form of counter-anodes, at which oxygen production takes place. In oxygen production, which is also denoted "Oxygen Evolution Reaction" or OER, the respective anion of the electrolyte 2 is converted into elemental oxygen with the release of electrons. To improve oxygen production efficiency, the counter-anodes 8 are provided with a suitable catalyst, which accelerates conversion of the respective anion to elemental oxygen.

If light in the direction of arrow 3 is incident from above on the cell for hydrogen splitting, then elemental hydrogen arises at the catalytically active layer 4, whereas elemental oxygen is produced at the counter-electrodes 8. To prevent an explosive mixture of hydrogen and oxygen from arising, it is necessary to delimit oxygen production spatially from hydrogen production. In the solution shown in FIG. 1, membrane tubes 9 are provided for this purpose which enclose the longitudinally extending counter-electrodes 8 in the form of a tube consisting of a membrane material at a given distance from the counter-electrode 8 arranged within the membrane tube. In this way, the oxygen production taking place within the membrane tubes 9 is separated spatially from the hydrogen production taking place at the catalytically active layer 4, such that the oxygen and hydrogen bubbles arising do not come into contact with one another. The same electrolyte is preferably used within the membrane tubes 9 as outside the membrane tubes 9. It may however be advantageous, for example, to provide the electrolyte within the membrane tubes 9 or the electrolyte in the rest of the cell selectively with added substances which cannot pass through the membrane. For example, the electrolyte within the membrane tubes 9 or the electrolyte in the rest of the cell could be provided selectively with added substances which improve the stability of the electrodes, or with a surfactant to control bubble formation. The hydrogen formed within the membrane tubes 9 may then be transported away via the membrane tubes 9. A proton-conducting membrane, as offered for sale for example under the name "Nafion", is preferably used as the material for the membrane tubes 9. Such membranes are permeable to protons, but not to elemental oxygen or hydrogen or other ions.

In the discussion hitherto, the catalytically active layer 4 takes the form of a cathode and the counter-electrodes 8 take the form of counter-anodes. Alternatively, however, the catalytically active layer 4 may also take the form of an anode, at which the oxygen production, i.e. the "Oxygen Evolution Reaction", then takes place. In this case, the counter-electrodes 8 would be embodied as cathodes at which the hydrogen production, i.e. the "Hydrogen Evolution Reaction", then accordingly takes place. As the electrolyte 2, either an electrolyte in an acidic environment or an electrolyte in a basic environment may be selected, wherein the electrolyte should be specifically selected as a function of the respective configuration of the semiconductor absorber 1. There is namely a risk of the surface of the semiconductor absorber 1 and in particular the catalytically active layer 4 being attacked and corroded by the electrolyte 2. If the catalytically active layer 4 takes the form of a cathode, it is advantageous to use an electrolyte in an acidic environment, for example perchloric acid. As a catalyst for hydrogen production at the cathode, platinum (Pt) and rhodium (Rh) may for example be used, as described above. Ruthenium oxide $RuO_2$, iridium oxide $IrO_2$ or DSA (Dimensionally Stable Anodes), which consist of titanium and a ruthenium-titanium oxide, would then be used as catalysts for oxygen production at the counter-electrode. Examples which could be mentioned of efficient catalysts for HER in an acidic electrolyte are NiMo, NiMoCo, NiW, NiMoFe and CoMo. For HER in a basic environment, NiMo, CoMo, NiFe, NiMoFe and CoNiFe could for example be used as catalysts. For OER in a basic environment, NiZn, CoP, CoFe, NiFe, NiSn, NiMoFe and NiNiFeCoCe would be suitable as catalysts.

Figure 2:
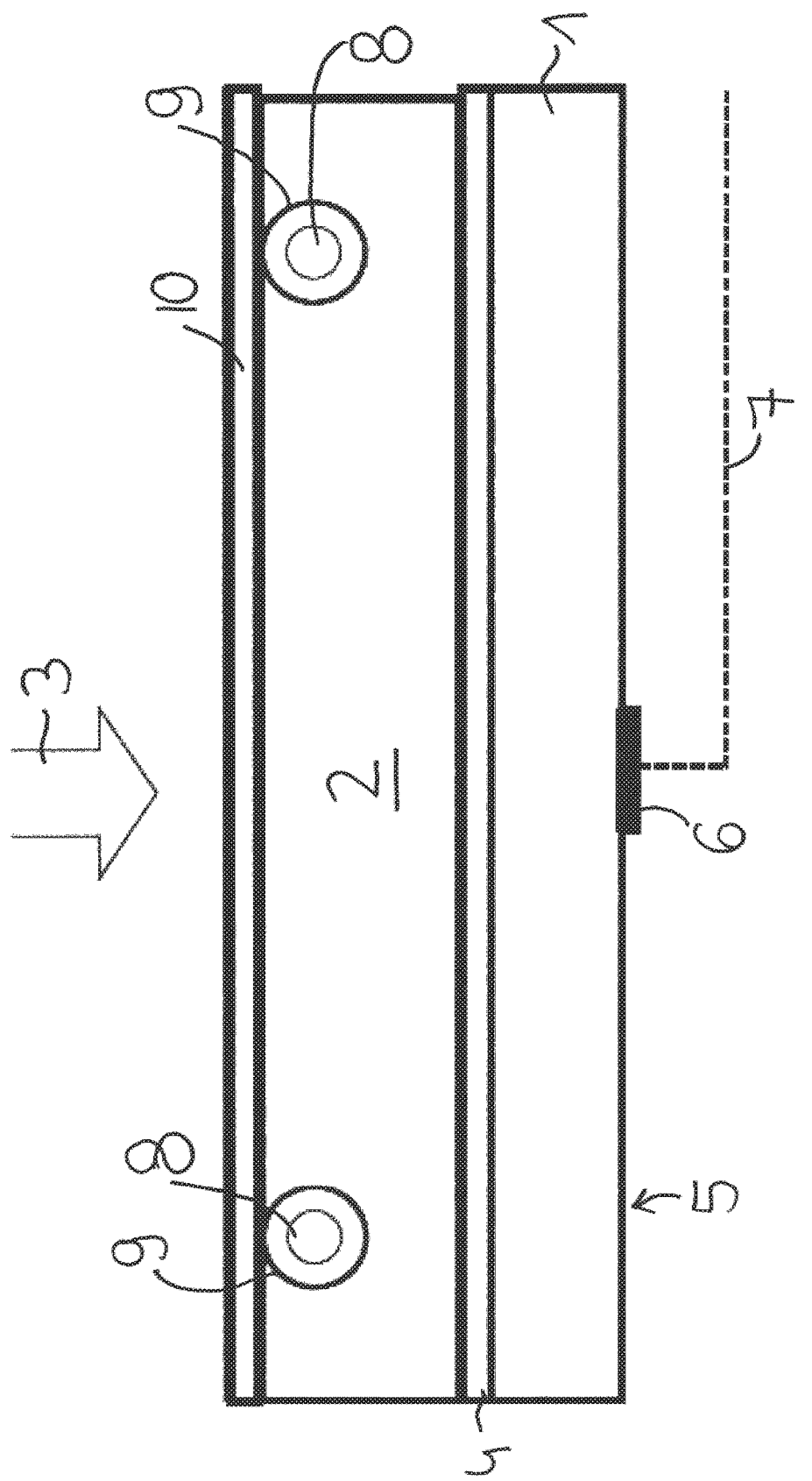
FIG. 2: shows a cross-section through a cell for water splitting.

FIG. 2 shows a cross-section through the cell shown schematically in FIG. 1 for solar water splitting. The semiconductor absorber 1 is again apparent, with the catalytically active layer 4 and surrounded by the electrolyte 2. The cell shown in FIG. 2 is covered on the upper side by a plate 10 of glass or transparent plastics material. If light incident in the direction of arrow 3 impinges through the plate 10 and the electrolyte 2 on the catalytically active layer 4, which in the present case is embodied as a cathode, then bubbles of elemental hydrogen are produced at the cathode. The production of oxygen bubbles begins at the counter-electrodes 8, which are connected via the electrical line 7 and the ohmic contact 6 to the rear of the semiconductor absorber 1. In this case, the longitudinally extending counter-electrodes 8 are each surrounded by a membrane tube 9 of proton-conducting material. The transport of ions takes place within the electrolyte 2, wherein the cations are transported to the catalytically active layer 4 of the semiconductor absorber 1. In this case, the electrolyte 2 counters ion transport with an ohmic resistance, which leads to losses. To design an efficiently operating cell for solar water splitting, it is therefore necessary to keep the ion transport distances within the electrolyte small. In this respect it has proved worthwhile for the spacing between neighboring counter-electrodes to be selected in the range of about 0.5 cm to 20 cm, more preferably between about 1 cm and 6 cm. In this case, the transport distances are sufficiently small to prevent ohmic losses.

FIG. 3 shows an example of a cell for solar water splitting corresponding to the embodiments of the invention. The cell comprises a semiconductor absorber 11 with a catalytically active layer 12 applied thereto which is surrounded by an electrolyte 13. Towards the light incidence side, the cell is delimited by a transparent cover element 14, which may consist for example of glass, silica glass or of a transparent plastics material. The transparent cover element 14 could for example be made from cycloolefin copolymers, which are distributed under the trade name "Zeonor". If light is radiated onto the upper side of the cell in the direction of arrow 15, the light penetrates the transparent cover element 14 and the electrolyte located therebelow and acts on the semiconductor absorber 11. As a result of the charge separation arising in the semiconductor absorber 11 in the event of incident light radiation, electrons are provided at the catalytically active layer 12, such that the reaction of H+ ions to yield elemental hydrogen may start at the catalytically active layer 12. The hydrogen bubbles 16 arising ascend upwards in the electrolyte 13 as a result of buoyancy and impinge on the curved or inclined stop face 17 on the underside of the transparent cover element 14, which serves as a stop face for the upwardly ascending hydrogen bubbles 16. As a result of the inclination or curvature of the stop face 17 and of the buoyancy acting on the hydrogen bubbles 16, the hydrogen bubbles 16 are guided along the underside of the transparent cover element 14 to one of the channel spaces 18, which extend longitudinally on the underside of the transparent cover element 14 perpendicular to the leaf plane. The channel spaces 18 are provided at the underside of the transparent cover element 14 in the form of recesses or notches, which extend from the underside of the transparent cover element 14 into the transparent cover element 14.

In this respect, the channel spaces 18 are not filled with electrolyte. The interior of the cell for solar water splitting is namely not filled completely but rather merely in part with the electrolyte 13. The interior of the cell for solar water splitting is filled with the electrolyte 13 only up to the electrolyte surface 19 shown in FIG. 3, whereas the region above the electrolyte surface 19 and in particular also the channel spaces 18 are filled with air or with a gas. Through the only partial filling of the cell with the electrolyte 13, it is ensured that the channel spaces 18 may be used to transport away the gas arising.

The hydrogen bubbles 16 ascending upwards as a consequence of buoyancy follow, as a result of their buoyancy, the course of the curved or inclined stop face 17 on the underside of the transparent cover element 14 and are guided in this way to the channel spaces 18. The hydrogen arising collects within the channel spaces 18 at the upper end of the channel space 18 and may be channeled via the channel space 18 out of the cell for solar water splitting. Through the interplay of curved or inclined stop faces 17 with the channel spaces 18, the hydrogen bubbles 16 arising at the catalytically active layer 12 may be efficiently collected and channeled to the channel spaces 18. In this way, the gas bubbles present in the electrolyte 13 may be channeled rapidly out, so reducing the light scattering within the electrolyte 13 caused by the gas bubbles. Through this improvement in the light transmittance of the electrolyte 13, the incident light may be better used than previously for water splitting, such that a cell with improved efficiency is obtained.

A further improvement in the efficiency of the cell is achieved by optical elements 20, which are arranged on the upper side of the transparent cover element 14 and follow the course of the channel spaces 18 located therebelow. In this respect, both the channel spaces 18 and the optical elements 20 arranged thereabove extend above one another in the longitudinal direction of the transparent cover element 14. If the transparent cover element 14 is observed from above, the optical elements 20 overlap in their course the channel spaces 18 located therebelow. The channel spaces 18 are therefore shaded or concealed by the optical elements 20 located thereabove. The task of the optical elements 20 is to direct incident light, which would per se impinge on channel space 18 and thus not be available for solar water splitting, past the channel spaces 18 into the electrolyte 13 and to the semiconductor absorber 11. To this end, the optical elements 20 may for example take the form of prism structures, lens elements or Fresnel lenses. In the example shown in FIG. 3, the optical elements 20 take the form of prisms, which direct an incident light beam 21 past the channel space 18 therebelow into the electrolyte 13 of the cell, as illustrated in FIG. 3 by the light beam 21. The optical elements 20 thus have the task of directing incident light past the channel spaces 18 into the electrolyte 13 and to the semiconductor absorber 11 and thus of making it available for the solar water splitting. This measure prevents part of the light energy impinging on the surface of the cell from being lost and unused. The optical elements 20 ensure that all the light energy impinging on the surface of the cell reaches the semiconductor absorber 11 and may thus be used for solar water splitting. In this way, the efficiency of the cell is further increased.

The effect of conducting away the gas via the curved or inclined stop faces 17 and the channel spaces 18 may be improved still further by suitable surface treatment of the underside of the transparent cover element 14. To this end, the regions of the underside of the transparent cover element 14 which are in contact with the electrolyte 13 are subjected to a hydrophilic surface treatment or provided with a hydrophilic coating. In this case, in particular the stop face 17, which takes the form of a curved or inclined stop face for the hydrogen bubbles 16, is provided with a hydrophilic coating. This hydrophilic functionalization promotes wetting of the stop face 17 with the electrolyte 13 and thus in particular prevents hydrogen bubbles 16 impacting on the stop face from adhering thereto. In contrast, the regions of the underside which are not in contact with the electrolyte 13, thus in particular the internal wall of the channel spaces 18, are subjected to a hydrophobic surface treatment or provided with a hydrophobic coating, to prevent these surface regions from being wetted with electrolyte.

In the event of a cover element 14 consisting of glass or silica glass, the hydrophilic regions of the glass or silica glass surface are produced for example by treatment with oxygen plasma. Hydrophobic regions of glass or silica glass are produced by silanization, wherein dimethylchlorosilane is an example of a suitable silane which may be used. If the transparent cover element 14 consists, on the other hand, of plastics material, the surface regions of the plastics material already have hydrophobic characteristics. It is possible, however, to make given regions, such as for example the curved or inclined stop face 17, hydrophilic through treatment with an oxygen plasma. In this respect, the required hydrophilic surface regions may be produced even when using a plastics material such as for example cycloolefin copolymers.

In FIG. 3, the counter-electrodes 22 likewise extending in the longitudinal direction are visible below the channel spaces 18, these being connected electrically to the rear electrode of the semiconductor absorber 11. The counter-electrodes 22 are each surrounded by a membrane tube structure 23, which is arranged in part above and in part below the electrolyte surface 19. Above the electrolyte surface 19 the membrane tube structure 23 is formed by a V-shaped shaped part 24, which extends longitudinally and encloses a free space 25 not filled with electrolyte which may be used to transport away gas. Below the electrolyte surface 19 the counter-electrode 22 is surrounded by a proton-conducting membrane 26, which separates the region around the counter-electrode 22 from the rest of the electrolyte. The membrane 26 is fastened to both sides of the V-shaped shaped part 24. If light impinges on the semiconductor absorber 11, oxygen is produced at the counter-electrodes 22, wherein the oxygen bubbles arising ascend upwards as a result of buoyancy, such that the free space 25 fills with oxygen. The oxygen arising may then be transported away via the free space 25 of the membrane tube structure 23.

Figure 4A:
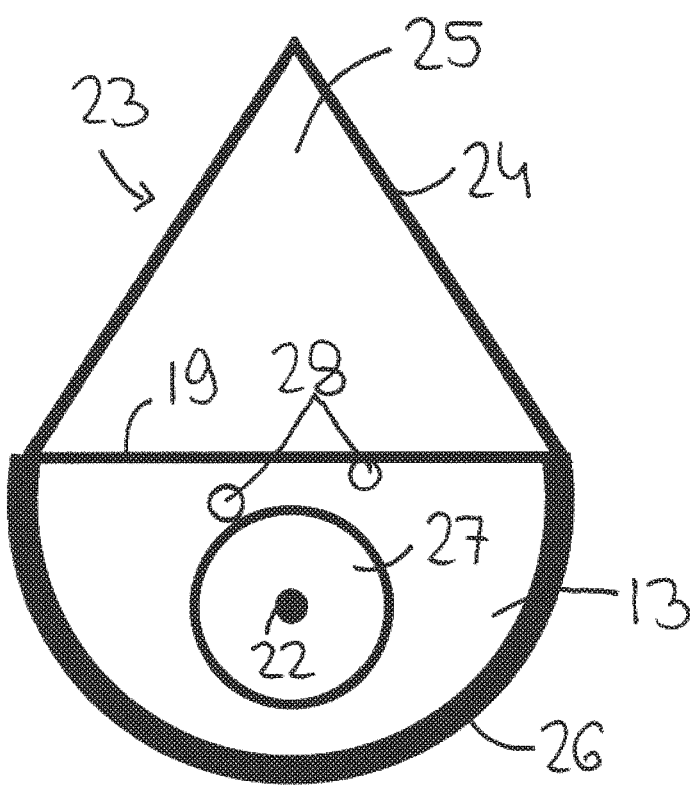
FIG. 4a: shows a cross-section through the membrane tube structure used in FIG. 3.

The membrane tube structure 23 is shown enlarged again in FIG. 4a. In FIG. 4a the longitudinally extending counter-electrode 22 is visible, which is arranged within the electrolyte 13. The counter-electrode 22 is surrounded by a catalyst 27, for example by a catalyst based on ruthenium oxide or iridium oxide. Above the electrolyte surface 19 the membrane tube structure 23 is formed by a V-shaped shaped part 24, which encloses a free space 25 located above the electrolyte surface 19. Below the electrolyte surface 19 the counter-electrode 22 is completely surrounded by the proton-conducting membrane 26. The oxygen bubbles 28 formed at the counter-electrode 22 when light is incident ascend as a result of buoyancy, such that the free space 25 is filled with oxygen. The oxygen which has arisen may be transported away via the free space 25.

The membrane tube structure 23 is preferably mounted on the transparent cover element 14 via connecting webs 29. The use of a membrane tube structure located directly at the electrolyte surface 19 and filled in part with electrolyte has the advantage, in particular, that the cell may be of a more compact design. The height 30 of the electrolyte-filled region is reduced, with the advantage being that the incident light is weakened only comparatively slightly by the electrolyte 13. Furthermore, the arrangement of the membrane tube structure 23 at the electrolyte surface 19 has the advantage that a free space 25 is formed for transporting away the oxygen arising. Overall, in the case of the cell for solar water splitting shown in FIG. 3, a structure is obtained in which the two means for conducting away gas, for the hydrogen and the oxygen, are arranged directly one above the other, such that the gas can be conducted away in space-saving manner. Furthermore, optical elements 20 are provided respectively above the two means for conducting away gas, which optical elements also deflect light impinging in the region of the means for conducting away gas towards the semiconductor absorber 11 and thus make it available, such that all incident light may be used. The structure shown in FIG. 3 makes it possible, by reducing the gas bubbles, through the reduction brought about thereby in light scattering in the electrolyte and due to the improved utilization of the incident light, to achieve overall an around 10% improvement in yield.

Figure 4B:
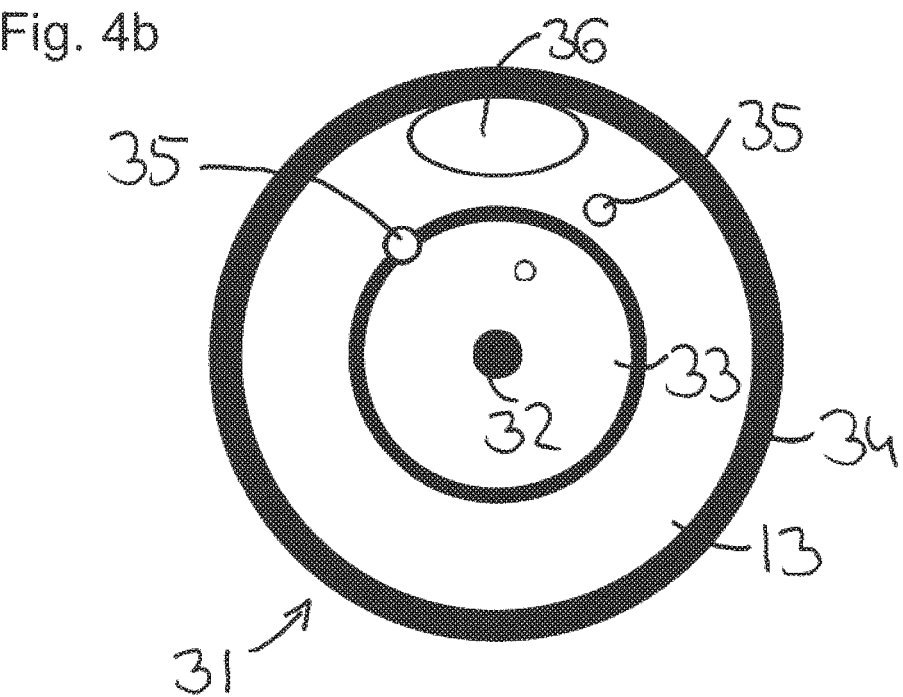
FIG. 4b: shows a further possibility for forming the membrane tubes.

As an alternative to the membrane tube structure 23 shown in FIG. 4a, however, membrane tubes may also be used in the cell shown in FIG. 3 which are arranged completely below the electrolyte surface. Such a membrane tube 31 is shown in cross-section in FIG. 4b. The membrane tube 31 mounted below the electrolyte surface comprises a counter-electrode 32, which extends longitudinally and is surrounded by a suitable catalyst 33. The counter-electrode 32 is surrounded by a proton-conducting membrane 34, wherein the membrane 34 completely encloses the counter-electrode 32 in the longitudinal direction. When light impinges on the semiconductor absorber 11, oxygen bubbles 35 arise at the counter-electrode 32 and collect in the upper region 36 of the membrane tube 31. The oxygen formed may then be transported away via the membrane tube 31. It is also possible, in this respect, to arrange the membrane tube 31 longitudinally inclined below the electrolyte surface, so as to promote transporting away of the gas by the inclined position of the membrane tube 31.

The features disclosed in the above description, the claims and the drawings may be of significance for implementation of the invention in its various embodiments either individually or in any desired combination.

LIST OF REFERENCE SIGNS

1 Semiconductor absorber
2 Electrolyte
3 Arrow
4 Catalytically active layer
5 Rear electrode
6 Ohmic contact
7 Electrical line
8 Counter-electrode
9 Membrane tube
10 Transparent cover element
11 Semiconductor absorber
12 Catalytically active layer
13 Electrolyte
14 Transparent cover element
15 Arrow
16 Hydrogen bubbles
17 Stop face
18 Channel space
19 Electrolyte surface
20 Optical element
21 Light beam
22 Counter-electrode
23 Membrane tube structure
24 V-shaped shaped part
25 Free space
26 Membrane
27 Catalyst
28 Oxygen bubbles
29 Connecting webs
30 Height
31 Membrane tube
32 Counter-electrode
33 Catalyst
34 Membrane
35 Oxygen bubbles
36 Upper region of the membrane tube

The invention claimed is:

1. A cell, which has
a transparent cover element, which is arranged on an upper side of the cell,
an interior which is arranged below the cover element and filled in part with an electrolyte, a semiconductor absorber, which is arranged in or on the electrolyte,
one or more counter-electrodes, which are arranged above the semiconductor absorber in the electrolyte and are electrically connected with a rear electrode arranged on a rear side of the semiconductor absorber remote from the cover element,
one or more membrane shells, wherein a counter-electrode extends within each membrane shell,
wherein
between an electrolyte surface and an underside of the cover element, one or more channel spaces are formed, which extend along one or more sub-regions of the underside of the cover element and are useful for conducting away a first gas formed in the interior of the cell and wherein
the underside of the cover element has at least one region at which the underside of the cover element is in contact with the electrolyte, wherein at least one portion of this at least one region forms a stop face for gas bubbles.

2. The cell as claimed in claim 1, wherein
the membrane shells take the form of membrane tubes surrounding the counter-electrodes.

3. The cell as claimed in claim 1, wherein
the cell is designed for light-induced water splitting.

4. The cell as claimed in claim 1, wherein
a counter-electrode and a membrane shell surrounding the counter-electrodes are respectively arranged below an associated channel space.

5. The cell as claimed in claim 1, characterized by at least one of the following:
one or more connecting webs are mounted on the cover element, with which connecting webs the counter-electrode and the membrane shell surrounding the counter-electrode are held in a position below an associated channel space;
the channel spaces are arranged over the counter-electrodes and the membrane shells surrounding the counter-electrodes, such that incident light passing through the cover element onto the semiconductor absorber is blocked as little as possible;
viewed from the upper side of the cover element, the channel spaces, the counter-electrodes and the membrane shells enclosing them at least largely overlap.

6. The cell as claimed in claims 1, wherein a second gas arising at the counter-electrodes may be conducted away via the membrane shells.

7. The cell as claimed in claim 1, wherein the stop faces for gas bubbles are provided at the underside of the cover element with a hydrophilic coating or are modified by means of a hydrophilizing surface treatment.

8. The cell as claimed in claim 1, characterized by at least one of the following:
at least one optical element is arranged in or on the cover element, which optical element is designed to direct incident light past the at least one channel space to the semiconductor absorber;
at least one optical element is arranged on or in the cover element, which optical element is designed to direct incident light past a channel space arranged respectively therebelow to the semiconductor absorber;

the at least one membrane shell is arranged within the cell in such a way that only part of the membrane shell is arranged within the electrolyte, wherein the electrolyte surface extends through the at least one membrane shell.

9. A cell, which has a transparent cover element, which is arranged on an upper side of the cell, an interior which is arranged below the cover element and filled in part with an electrolyte, a semiconductor absorber, which is arranged in or on the electrolyte, one or more counter-electrodes, which are arranged above the semiconductor absorber in the electrolyte and are electrically connected with a rear electrode arranged on a rear side of the semiconductor absorber remote from the cover element, one or more membrane shells, wherein a counter-electrode extends within each membrane shell, wherein the at least one membrane shell is arranged within the cell in such a way that only part of the membrane shell is arranged within the electrolyte, wherein an electrolyte surface extends through the at least one membrane shell.

10. The cell as claimed in claim 9, wherein the region of the membrane shell arranged above the electrolyte surface is available for conducting away a second gas formed at the counter-electrode extending within the membrane shell.

\* \* \* \* \*